(12) United States Patent
Lin et al.

(10) Patent No.: US 8,885,564 B2
(45) Date of Patent: Nov. 11, 2014

(54) MOBILE STATION, BASE STATION, COMMUNICATION SYSTEM AND ABNORMAL POWER DOWN REPORTING METHOD THEREOF

(75) Inventors: Yi-Ting Lin, New Taipei (TW);
Yi-Hsueh Tsai, New Taipei (TW);
Tsung-Yu Tsai, Tainan (TW);
Chun-Yen Hsu, Chiayi County (TW)

(73) Assignee: Institute For Information Industry, Taipei (TW)

( * ) Notice: Subject to any disclaimer, the term of this patent is extended or adjusted under 35 U.S.C. 154(b) by 152 days.

(21) Appl. No.: 13/618,296

(22) Filed: Sep. 14, 2012

(65) Prior Publication Data
US 2013/0070674 A1  Mar. 21, 2013

Related U.S. Application Data

(60) Provisional application No. 61/535,382, filed on Sep. 16, 2011, provisional application No. 61/536,484, filed on Sep. 19, 2011.

(51) Int. Cl.
*H04W 4/00* (2009.01)
*H04W 60/06* (2009.01)
*H04W 24/04* (2009.01)

(52) U.S. Cl.
CPC .............. *H04W 60/06* (2013.01); *H04W 24/04* (2013.01)
USPC .......................................................... 370/328

(58) Field of Classification Search
CPC combination set(s) only.
See application file for complete search history.

(56) References Cited

U.S. PATENT DOCUMENTS

2012/0226930 A1* 9/2012 Colban et al. ................. 713/340
2013/0315074 A1* 11/2013 Kim et al. ..................... 370/242

* cited by examiner

*Primary Examiner* — Jung-Jen Liu
(74) *Attorney, Agent, or Firm* — Skaar Ulbrich Macari, P.A.

(57) ABSTRACT

A mobile station, a base station, a communication system and an abnormal power down reporting method thereof are provided. The communication system includes the mobile station and the base station. The mobile station is located within a wireless communication range of the base station. The mobile station transmits a notification message to the base station after detecting abnormal power down of the mobile station. The base station determines that abnormal power down occurred in the mobile station according to the notification message, and notifies a backhaul network to deregister the mobile station.

30 Claims, 11 Drawing Sheets

MOBILE STATION, BASE STATION, COMMUNICATION SYSTEM AND ABNORMAL POWER DOWN REPORTING METHOD THEREOF

PRIORITY

This application claims the benefit of U.S. Provisional Application Ser. No. 61/535,382 filed on Sep. 16, 2011 and U.S. Provisional Application Ser. No. 61/536,484 filed on Sep. 19, 2011, both of which are hereby incorporated by reference herein in their entirety.

FIELD

The present invention relates to a mobile station, a base station, a communication system and an abnormal power down reporting method thereof. More particularly, the mobile station, the base station, the communication system and the abnormal power down reporting method thereof of the present invention can more efficiently accomplish reporting of abnormal power down between devices.

BACKGROUND

For a machine-to-machine power supply system, a relatively high processing cost is often caused at a power supply terminal when abnormal power down occurs in a terminal device that consumes electric energy. Accordingly, many international standard organizations (e.g., National Institute of Standards and Technology, European Telecommunications Standards Institute, and Institute of Electrical and Electronics Engineers) all commit themselves to formulation of an abnormal power down reporting mechanism in order to definitely clarify the happening time and the subject of occurrence of the abnormal power down.

Further speaking, as compared to a normal shutdown reporting process which has a relatively sufficient processing time duration, an abnormal power down reporting process usually can only use electric power remaining in a capacitor of the terminal device to make a final report for abnormal power down when the power down occurs abruptly. As the electric power remaining in the capacitor of the terminal device is much limited, a time duration available for making the final report usually lasts for only 150~250 milliseconds. However, the abnormal power down reporting mechanism formulated currently is still too complex, so the reporting time duration of 150~250 milliseconds may still be insufficient. Further, apart from considering the abnormal power down reporting of the single terminal device during formulation of the abnormal power down reporting mechanism, it is also necessary to consider the congestion problem which is easily caused when a large number of terminal devices make reports simultaneously. However, solving such a problem is also difficult for the abnormal power down reporting mechanism used currently.

Accordingly, in order to overcome the aforesaid shortcomings in the prior art, an urgent need exists in the art to more efficiently accomplish reporting of the abnormal power down of the terminal device in the machine-to-machine power supply system.

SUMMARY

To solve the aforesaid problems, the present invention provides a mobile station, a base station, a communication system and an abnormal power down reporting method thereof, which are mainly intended to accomplish reporting of abnormal power down together in the competition procedure. Thereby, by reducing the time duration needed for subsequent channel establishment, the rapid reporting of abnormal power down can be accomplished.

To achieve the aforesaid objective, the present invention in certain embodiments provides an abnormal power down reporting method for a mobile station, a base station and a communication system. The communication system according to certain embodiments comprises a mobile station and a base station. The mobile station is located within a wireless communication coverage of the base station. The abnormal power down reporting method comprises the steps of: (a) enabling the base station to transmit a service flow setting message to the mobile station, wherein the service flow setting message has an abnormal power down index which defines an abnormal power down status; (b) enabling the mobile station to detect abnormal power down occurred in the mobile station after step (a); (c) enabling the mobile station to transmit a notification message having the abnormal power down index to the base station via a contention channel after step (b); and (d) enabling the base station to determine that abnormal power down occurred in the mobile station according to the abnormal power down index of the notification message and notify a backhaul network to deregister the mobile station.

To achieve the aforesaid objective, the present invention further provides a mobile station, a base station and a communication system. The communication system according to certain embodiments comprises a mobile station and a base station. The mobile station is located within a wireless communication coverage of the base station. The base station transmits a service flow setting message to the mobile station. The service flow setting message has an abnormal power down index which defines an abnormal power down status. The mobile station detects abnormal power down occurred in the mobile station and transmits a notification message having the abnormal power down index to the base station via a contention channel. The base station determines that abnormal power down occurred in the mobile station according to the abnormal power down index of the notification message and notifies a backhaul network to deregister the mobile station.

To achieve the aforesaid objective, the present invention further provides an abnormal power down reporting method for a mobile station, a base station and a communication system. The communication system according to certain embodiments comprises a mobile station and a base station. The mobile station is located within a wireless communication coverage of the base station. The abnormal power down reporting method comprises the steps of: (a) enabling the mobile station to detect abnormal power down occurred in the mobile station; (b) enabling the mobile station to transmit a preamble code to the base station after step (a); (c) enabling the base station to transmit UL bandwidth allocation information to the mobile station according to the preamble code; (d) enabling the mobile station to transmit a message having an abnormal power down indication to the base station according to the UL bandwidth allocation information; and (e) enabling the base station to determine that abnormal power down occurred in the mobile station according to the abnormal power down indication and notify the backhaul network to deregister the mobile station.

To achieve the aforesaid objective, the present invention further provides a mobile station, a base station and a communication system. The communication system according to certain embodiments comprises a mobile station and a base station. The mobile station is located within a wireless communication coverage of the base station. The base station transmits a service flow setting message to the mobile station. The service flow setting message has an abnormal power down index which defines an abnormal power down status. The mobile station detects abnormal power down occurred in the mobile station and transmits a notification message having the abnormal power down index to the base station via a contention channel. The base station determines that abnormal power down occurred in the mobile station according to the abnormal power down index of the notification message and notifies a backhaul network to deregister the mobile station.

With the technical features disclosed above, the mobile station, the base station, the communication system and the abnormal power down reporting method thereof of the present invention can directly accomplish reporting of abnormal power down in the competition procedure. Thereby, the time duration needed for subsequent channel establishment and message transmission can be avoided.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to example embodiments thereof. However, these example embodiments are not intended to limit the present invention to any specific examples, embodiments, environments, applications or implementations described in these example embodiments. Therefore, description of these example embodiments is only for purpose of illustration rather than to limit the present invention. The scope of the invention shall be governed by the claims. It shall be appreciated that, in the following example embodiments and the attached drawings, elements not directly related to the present invention are omitted from depiction.

Figure 1A:
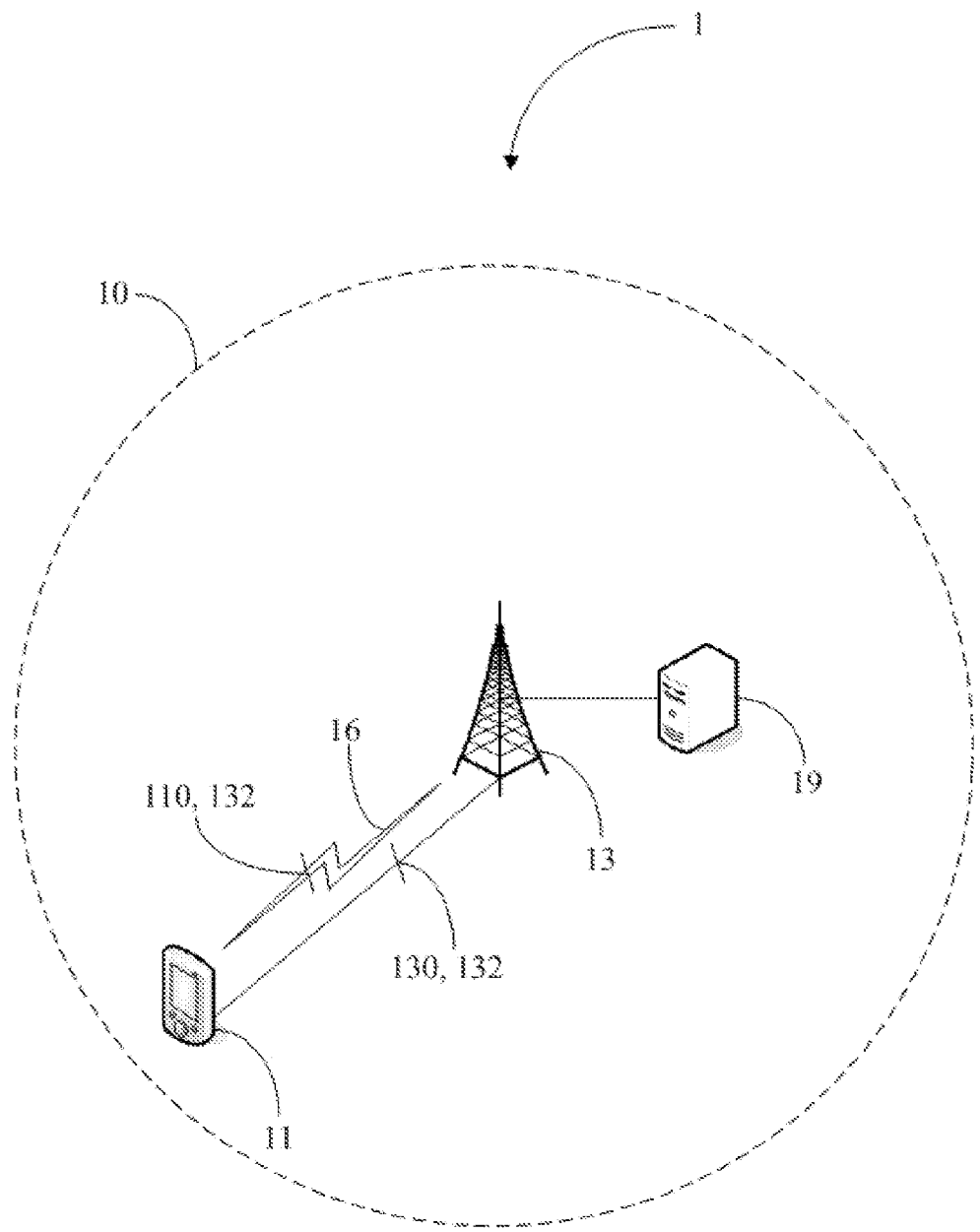
FIG. 1A is a schematic view of a communication system according to a first embodiment of the present invention.
Figure 1B:
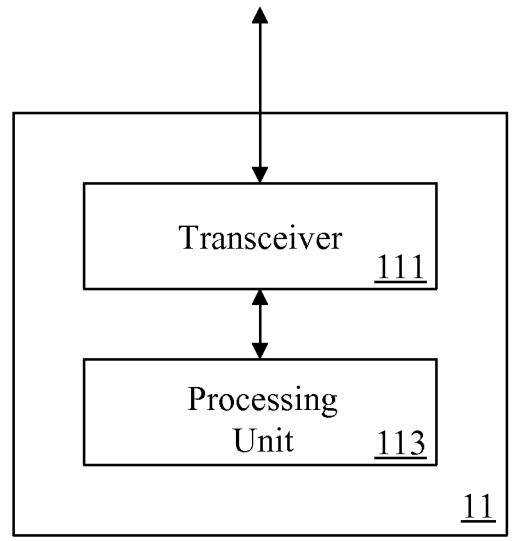
FIG. 1B is a schematic view of a mobile station according to the first embodiment of the present invention.
Figure 1C:
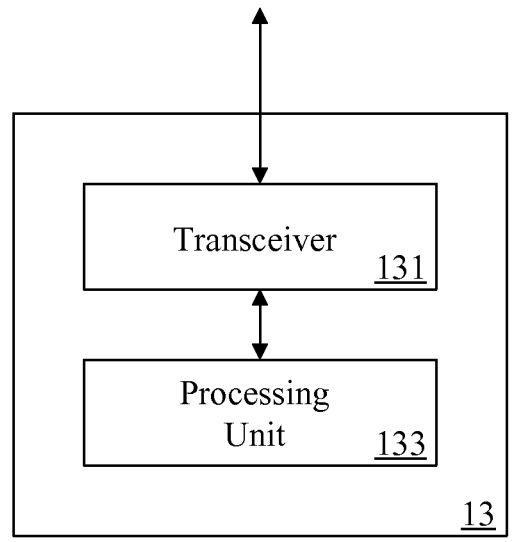
FIG. 1C is a schematic view of a base station according to the first embodiment of the present invention.

Refer to FIG. 1A to FIG. 1C. FIG. 1A is a schematic view of a communication system 1 according to a first embodiment of the present invention; FIG. 1B is a schematic view of a mobile station 11 according to the first embodiment of the present invention; and FIG. 1C is a schematic view of a base station 13 according to the first embodiment of the present invention. The machine-to-machine system 1 comprises the mobile station 11 and the base station 13. The mobile station 11 has a transceiver 111 and a processing unit 113, and the base station 13 has a transceiver 131 and a processing unit 133. The mobile station 11 is located within a wireless communication coverage 10 of the base station 13.

It shall be firstly appreciated that, the communication system of the present invention may be a machine-to-machine system, the mobile station may be a device capable of performing basic operations and network connection such as an advanced mobile station, a smart electric meter or a hand-held device, and the base station may be a backend operating device such as an advanced base station or a server; however, this is not intended to limit the implementations of the present invention. Interactions between the network components will be further elucidated hereinbelow.

Firstly, because the notification messages at the initial stage of the bandwidth request process usually carries a bandwidth request index, so the bandwidth request index that is extra defined can be used to report the abnormal power down. Particularly, the transceiver 131 of the base station 13 firstly transmits a service flow setting message 130 to the mobile station 11. The service flow setting message 130 comprises a bandwidth request index 132 (such as the un-defined bandwidth request index in the prior protocols). Then, the bandwidth request index 132 can be used to define an abnormal power down status. Thus, when the mobile station 11 is to report the abnormal power down subsequently, the reporting can be accomplished by use of the bandwidth request index 132 directly in the bandwidth request process.

It should be noted that the service flow setting message 130 may be a normal service flow setting message such as Dynamic Service Addition Request (DSA-REQ) or Advance Air Interface Dynamic Service Addition Request (AAI-DSA-REQ) of IEEE 802.16. However, this is not intended to limit the implementations the service flow setting message of the present invention.

Afterwards, because data is transmitted via a contention channel (for example, the contention channel used in the ranging procedure or bandwidth request procedure of IEEE 802.16) firstly at an initial stage of the bandwidth request process, the present invention carries out abnormal power down reporting in the contention channel directly to improve the timeliness of information transmission.

Particularly, when abnormal power down of the mobile station 11 is detected by the processing unit 113 of the mobile station 11, the transceiver 111 of the mobile station 11 transmits a notification message 110 having the abnormal power down index 132 to the base station 13 via a contention channel 16. Then, upon receiving the notification message 110 by the transceiver 111, the processing unit 113 of the base station 13 determines that abnormal power down occurred in the mobile station 11 according to the abnormal power down index 132 of the notification message 110 and notifies a backhaul network 19 to deregister the mobile station 13.

In this way, the mobile station, the base station and the communication system of the present invention can accomplish the reporting of the abnormal power down timely in the bandwidth request process and the mobile station can be deregistered by the backhaul network. It shall be particularly appreciated that, the notification message may be Quick Access Message of IEEE 802.16, and the backhaul network may be a common conventional network entity connected with a base station such as the Access Services Network Gateway (ASN-Gateway) of the IEEE 802.16 or the Mobility Management Entity (MME) of the 3GPP; however, similarly, this is not intended to limit the implementations of the present invention.

For example, an abnormal power down index 0b11 (which may be an un-defied bandwidth request index of a conventional network) is firstly defined between the mobile station and the base station as a notification of abnormal power down. Therefore, after detecting the abnormal power down, the mobile station transmits the notification message (e.g., a bandwidth request message of the conventional network) carrying the bandwidth request index 0b11 to the base station; and then, the base station can directly determine that the abnormal power down occurred in the mobile station according to the received notification message carrying the abnormal power down index 0b11 and then deregister the mobile station accordingly.

Figure 2:
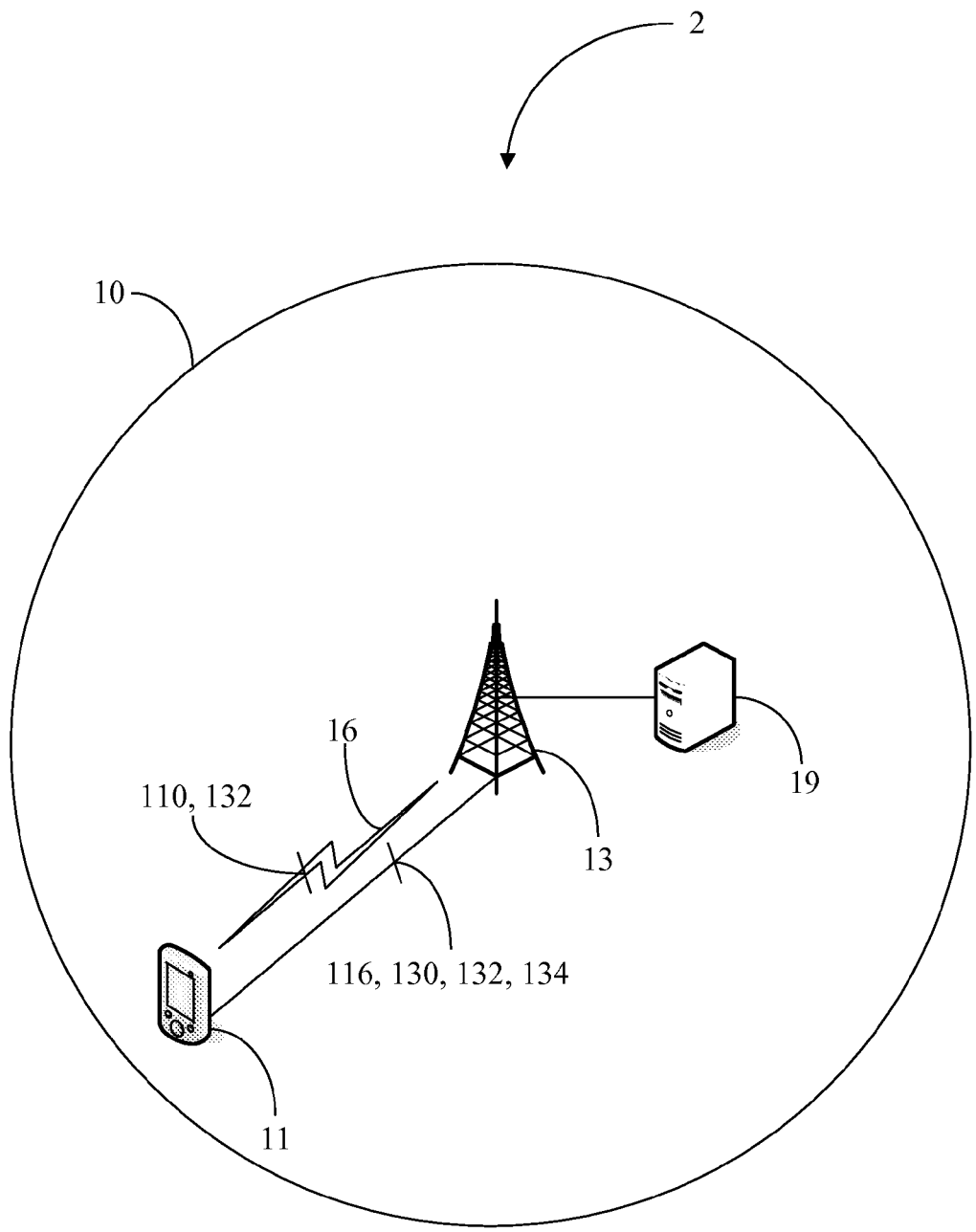
FIG. 2 is a schematic view of a communication system according to a second embodiment of the present invention.

Referring to FIG. 2, there is shown a schematic view illustrating operations of a communication system 2 according to a second embodiment of the present invention. It shall be particularly appreciated that, the third embodiment has the same system architecture and the same network connection environment as the aforesaid embodiments, so the components bearing the same reference numerals also have the same functions and will not be further described herein. However, the second embodiment differs from the aforesaid embodiments in that: the second embodiment can determine whether the message transmitted by the mobile station is true through a confirmation process so as to avoid mistakenly deregistering the mobile station.

Particularly, also an abnormal power down status is firstly defined between the mobile station 11 and the base station 13 by the abnormal power down index 132 carried in the service flow setting message 130. Likewise, after abnormal power down is detected by the processing unit 113 of the mobile station 11, the transceiver 111 can transmit the notification message 110 having the abnormal power down index 132 to the base station 13 via the contention channel 16.

Then, in order to determine whether the message received from the mobile station 11 is trustworthy, the transceiver 131 of the base station 13 can firstly transmit uplink (UL) bandwidth allocation information 134 to the mobile station 11. After receiving the UL bandwidth allocation information 134 transmitted by the base station 13, the transceiver 111 of the mobile station 11 transmits confirmation information 116 to the base station 13.

In this way, the processing unit 133 of the base station 13 can firstly determine whether the confirmation information 116 is correct. If the confirmation information 116 is correct, which represents that the mobile station 11 is trustworthy, then the processing unit 133 of the base station 13 determines that the mobile station 11 is legal; and then, the processing unit 133 of the base station 13 determines that the abnormal power down occurred in the mobile station 11 according to the bandwidth request index 132 and notifies the backhaul network 19 to deregister the mobile station 11. Conversely, if the processing unit 133 of the base station 13 determines that the confirmation information 116 is incorrect, which represents that the mobile station 11 may not be trustworthy, then the base station 13 will not notify the backhaul network 19 to deregister the mobile station 11.

It shall be particularly appreciated that, message confirmation can be accomplished by completely or partially comparing the media access control (MAC) address, the cipher-based media access control (CMAC) address or the hash message authentication code (HMAC). However, since it is just a conventional identification approach, it will not be further described herein.

In addition, the UL bandwidth allocation information is one of the messages by which the base station allocates bandwidth to the mobile station for information transmission in the bandwidth request process. The UL bandwidth allocation information may have different forms in different network protocols, for example, in the form of the code division multiple access allocation information element (CDMA allocation IE) in the WiMAX. However, this is not intended to limit the technical features of the present invention, and people skilled in the art can readily use different message forms corresponding to different network protocols according to the concept of the present invention.

Figure 3:
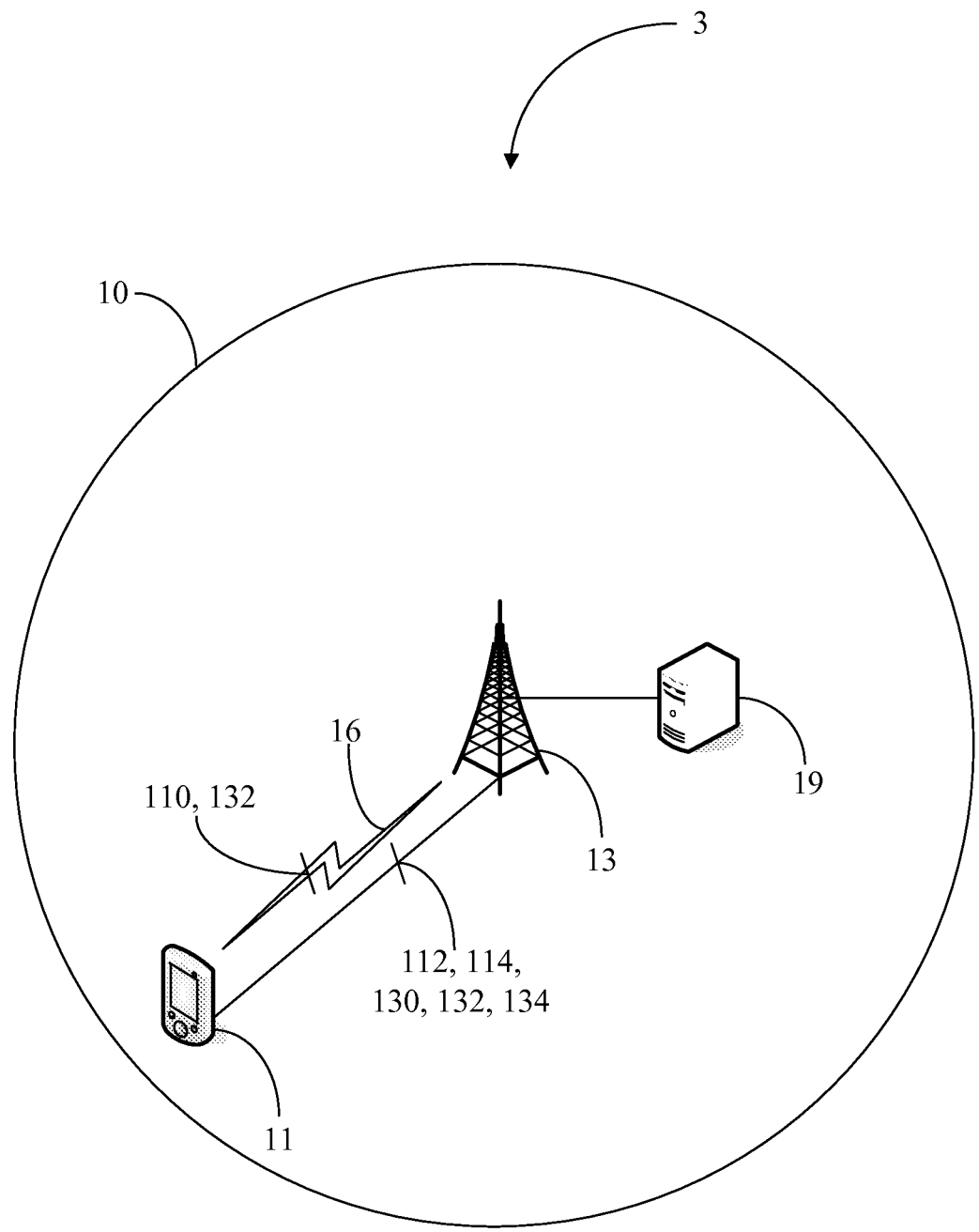
FIG. 3 is a schematic view of a communication system according to a third embodiment of the present invention.

Then referring to FIG. 3, there is shown a schematic view illustrating operations of a communication system 3 according to a third embodiment of the present invention. It shall be particularly appreciated that, the third embodiment has the same system architecture and the same network connection environment as the aforesaid embodiments, so the components bearing the same reference numerals also have the same functions and will not be further described herein. However, the third embodiment differs from the aforesaid embodiments in that: in case a message transmitted by the mobile station to the base station experiences message collision, the mobile station can make a notification of abnormal power down by using other messages during the bandwidth request process in the third embodiment.

In detail, an abnormal power down status is also firstly defined between the mobile station 11 and the base station 13 by the abnormal power down index 132 carried in the service flow setting message 130. However, when different network messages are transmitted to the base station 13 simultaneously, message collision may occur between the abnormal power down index 132 transmitted by the mobile station 11 and other notification messages. In the third embodiment, the processing unit 133 of the base station 13 determines that the abnormal power down index 132 of the mobile station 11 experiences message collision. Then, similarly, the transceiver 131 of the base station 13 then transmits the UL bandwidth allocation information 134 to the mobile station 11.

Then, the transceiver 111 of the mobile station 11 can transmit a message 114 having an abnormal power down indication 112 to the base station 13 according to the UL bandwidth allocation information 134. Thus, even if the processing unit 133 of the base station 13 cannot determine whether the abnormal power down occurred in the mobile station 11 according to the abnormal power down index 132 that experiences the message collision, the processing unit 133 of the base station 13 can still, after the abnormal power down indication 112 additionally carried in the message 114 is received by the transceiver 131, learn in the bandwidth request process that the abnormal power down occurred in the mobile station 11 and notify the backhaul network 19 to deregister the mobile station 11.

It shall be particularly appreciated that, the message 114 of the third embodiment may be header contents that have been already defined in prior communication protocol, and information of the abnormal power down indication 112 can be carried simply by bits unused in the header. On the other hand, the message may also be customized header contents, in which case the message can be used more flexibly.

Figure 4:
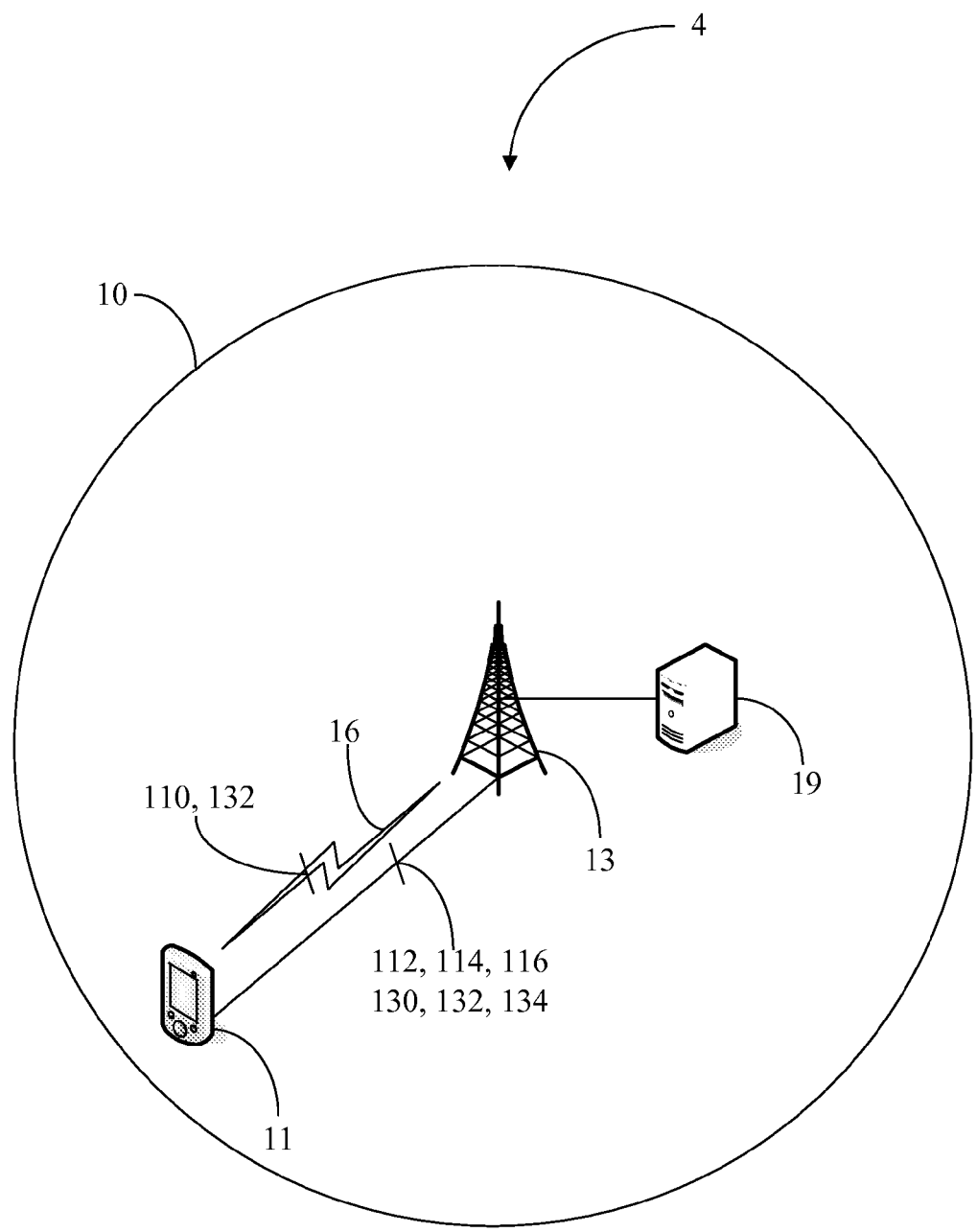
FIG. 4 is a schematic view of a communication system according to a fourth embodiment of the present invention.

Then referring to FIG. 4, there is shown a schematic view illustrating operations of a communication system 4 according to a fourth embodiment of the present invention. It shall be particularly appreciated that, the fourth embodiment has the same system architecture and the same network connection environment as the aforesaid embodiments, so the components bearing the same reference numerals also have the same functions and will not be further described herein. However, as a difference from the aforesaid embodiments, the following will be detailed in the fourth embodiment: in case a message transmitted by the mobile station to the base station experiences message collision, the mobile station will use other messages during the bandwidth request process to accomplish reporting of abnormal power down and a confirmation process simultaneously.

Likewise, an abnormal power down status is firstly defined between the mobile station 11 and the base station 13 by the abnormal power down index 132 carried in the service flow setting message 130. However, when different messages are transmitted to the base station 13 simultaneously, message collision may occur between the abnormal power down index 132 transmitted by the mobile station 11 and other messages. In the fourth embodiment, the base station determines that the abnormal power down index 132 of the mobile station 11 also experiences message collision. Then, the base station 13 similarly transmits the UL bandwidth allocation information 134 to the mobile station 11.

Then, the transceiver 111 of the mobile station 11 transmits the message 114 having the abnormal power down indication 112 to the base station 13 according to the UL bandwidth allocation information. Meanwhile, the transceiver 111 of the mobile station 11 transmits confirmation information 116 to the base station 13. Thus, after the confirmation information 116 is received by the transceiver 131 of the base station 13, the processing unit 133 of the base station 13 can also firstly determine whether the confirmation information 116 is correct.

In detail, if the confirmation information 116 is correct, which represents that the mobile station 11 is trustworthy, then the processing unit 133 of the base station 13 determines that the mobile station 11 is legal; and then, the processing unit 133 of the base station 13 determines that the abnormal power down occurred in the mobile station 11 according to the abnormal power down indication 112 of the message 114 and notifies the backhaul network 19 to deregister the mobile station 11. Conversely, if the processing unit 133 of the base station 13 determines that the confirmation information 116 is incorrect, which represents that the mobile station 11 is not trustworthy, then the base station 13 will not notify the backhaul network to deregister the mobile station 11.

It shall be particularly noted that, if the message used is a header that has already been defined and does not have enough available bits for carrying the confirmation information, then the confirmation information can be independently transmitted to the base station in a way as described in the fourth embodiment. On the other hand, if the message used is a customized header, then appropriate bits can be allocated to carry the confirmation information; and thus, the confirmation information can be transmitted to the base station together with the customized header so as to save the network resource.

Figure 5:
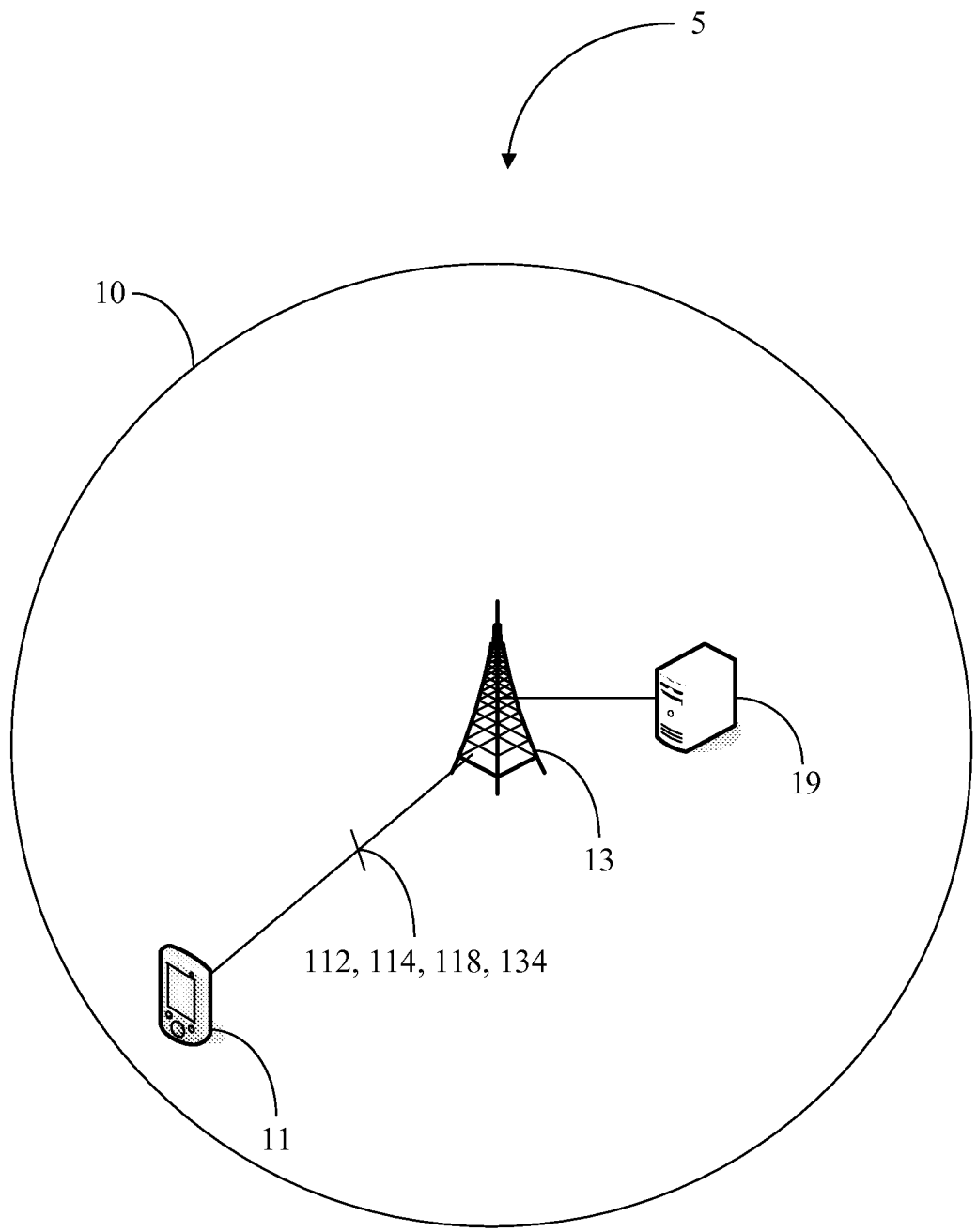
FIG. 5 is a schematic view of a communication system according to a fifth embodiment of the present invention.

Referring to FIG. 5, there is shown a schematic view illustrating operations of a communication system 5 according to a fifth embodiment of the present invention. It shall be particularly appreciated that, the fifth embodiment has the same system architecture and the same network connection environment as the aforesaid embodiments, so the components bearing the same reference numerals also have the same functions and will not be further described herein. However, the fifth embodiment mainly focuses on the following description: reporting of abnormal power down can still be accomplished in the competition procedure when the network environment (e.g., IEEE 802.16p, 3GPP GSM, UMTS, LTE or LTE-A) has no abnormal power down index set therein.

Specifically, after abnormal power down of the mobile station 11 is detected by the processing unit 113 of the mobile station 11 in the network environment having no abnormal power down index set therein, the transceiver 111 of the mobile station 11 directly transmits a preamble code 118 (without any index) to the base station 13. Then, after the preamble code 118 is received by the transceiver 131 of the base station 13 from the mobile station 11, the UL bandwidth allocation information 134 is directly transmitted to the mobile station 11.

Similarly, the transceiver 111 of the mobile station 11 can then transmit the message 114 having an abnormal power down indication 112 to the base station 13 according to the UL bandwidth allocation information 134. Then, the processing unit 133 of the base station 13 determines that the abnormal power down occurred in the mobile station 11 according to the abnormal power down indication 112 and notifies the backhaul network to deregister the mobile station 11.

Thus, even though no abnormal power down index is set in the network environment, reporting of the abnormal power down can still be accomplished in the bandwidth request process according to the present invention. It should be noted that the message 114 may be abnormal power down reporting header in IEEE 802.16p or Radio Resource Control (RRC) request in 3GPP. However, it is not intended to limit the implementation of the message.

It shall be particularly emphasized that, the abnormal power down reporting technology of the fifth embodiment can also further customize a header and allocate appropriate bits in the header to carry the abnormal power down indication and the confirmation information. In this way, as the same as the aforesaid embodiments, the legality of the mobile station can be confirmed firstly based on the confirmation information of the customized header. Then the mobile station is deregistered based on the abnormal power down indication.

Figure 6:
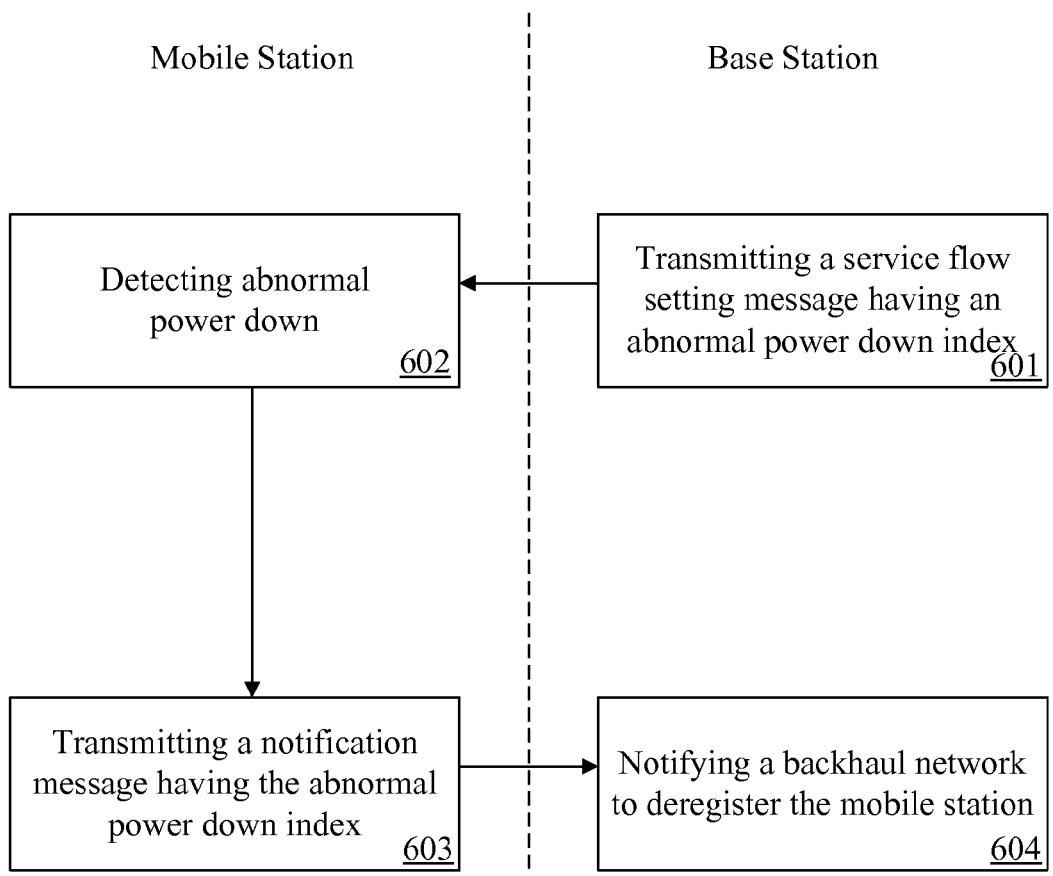
FIG. 6 is a flowchart diagram of an abnormal power down reporting method according to a sixth embodiment of the present invention.

A sixth embodiment of the present invention is an abnormal power down reporting method, a flowchart diagram of which is shown in FIG. 6. The method of the sixth embodiment is for use in a communication system (e.g., the communication system 1 of the aforesaid embodiment) as well as a mobile station and a base station (e.g., the mobile station 11 and the base station 13 of the aforesaid embodiment) comprised in the communication system. The mobile station is located within a wireless communication coverage of the base station. Detailed steps of the sixth embodiment are as follows.

Firstly, step 601 is executed to enable the base station to transmit a service flow setting message to the mobile station. The service flow setting message has an abnormal power down index which defines an abnormal power down status. Step 602 is executed to enable the mobile station to detect abnormal power down of the mobile station. Then, step 603 is executed to enable the mobile station to transmit a notification message having the abnormal power down index to the base station via a contention channel. Finally, step 604 is executed to enable the base station to determine that the abnormal power down occurred in the mobile station according to the abnormal power down index and notify a backhaul network to deregister the mobile station.

Figure 7:
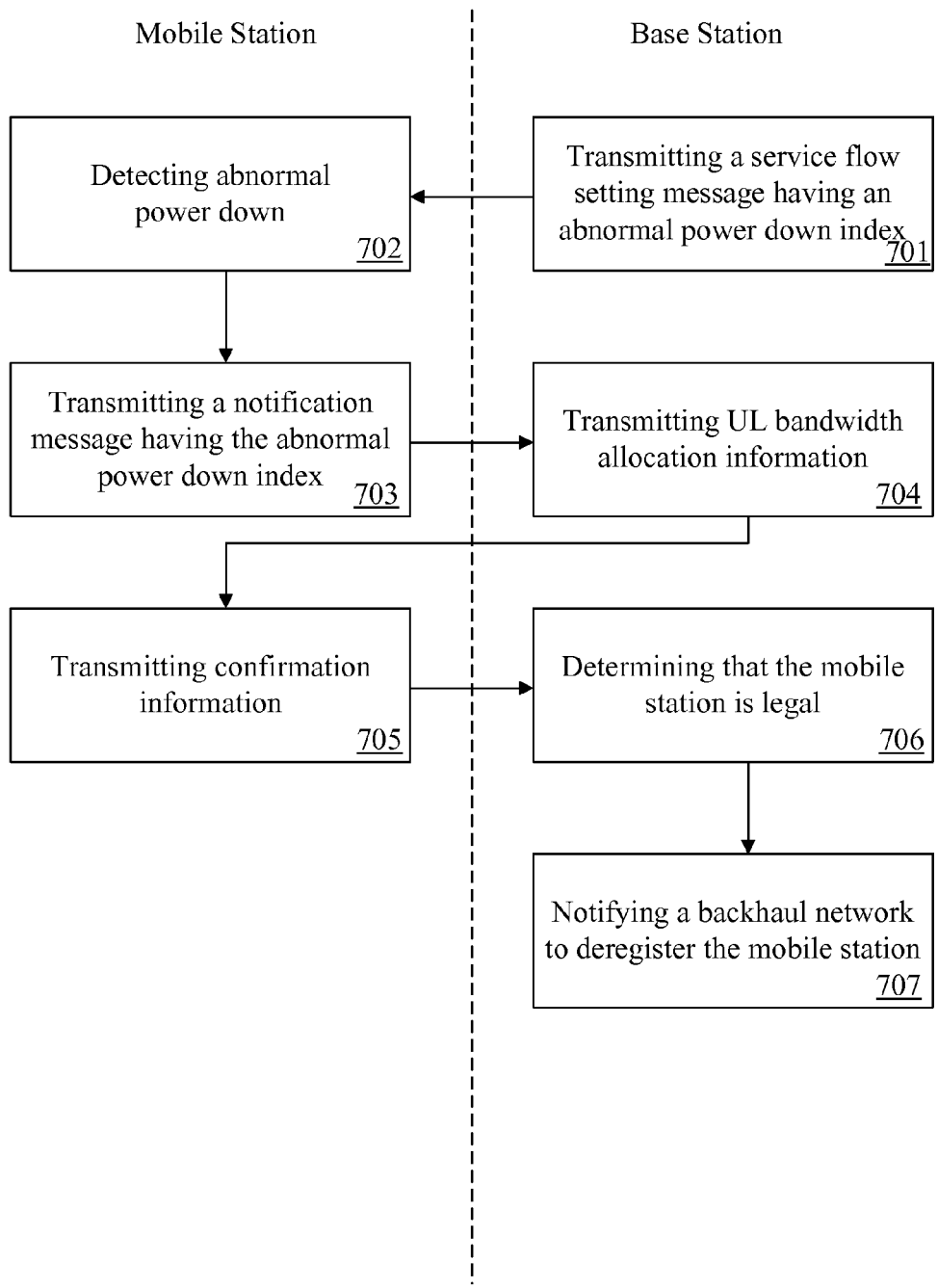
FIG. 7 is a flowchart diagram of an abnormal power down reporting method according to a seventh embodiment of the present invention.

A seventh embodiment of the present invention is an abnormal power down reporting method, a flowchart diagram of which is shown in FIG. 7. The method of the seventh embodiment is for use in a communication system (e.g., the communication system 2 of the aforesaid embodiment) as well as a mobile station and a base station (e.g., the mobile station 11 and the base station 13 of the aforesaid embodiment) comprised in the communication system. The mobile station is located within a wireless communication coverage of the base station. Detailed steps of the seventh embodiment are as follows.

Firstly, step 701 is executed to enable the base station to transmit a service flow setting message to the mobile station. The service flow setting message comprises an abnormal power down index which defines an abnormal power down status. Step 702 is executed to enable the mobile station to detect abnormal power down of the mobile station. Then, step 703 is executed to enable the mobile station to transmit a notification message having the abnormal power down index to the base station via a contention channel.

Then, step 704 is executed to enable the base station to transmit UL bandwidth allocation information to the mobile station. Step 705 is executed to enable the mobile station to transmit confirmation information to the base station according to the UL bandwidth allocation information. Then, step 706 is executed to enable the base station to determine that the mobile station is legal according to the confirmation information. Finally, step 707 is executed to enable the base station to determine that the abnormal power down occurred in the mobile station according to the abnormal power down index and notify a backhaul network to deregister the mobile station.

Figure 8:
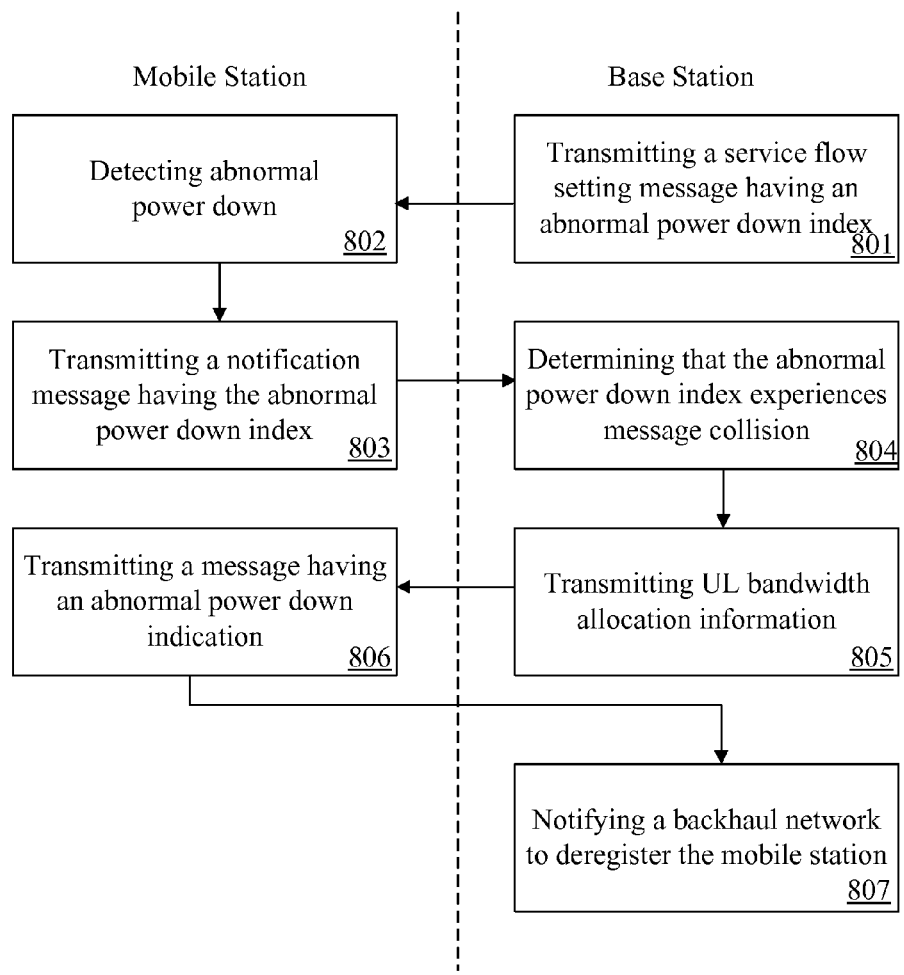
FIG. 8 is a flowchart diagram of an abnormal power down reporting method according to an eighth embodiment of the present invention.

An eighth embodiment of the present invention is an abnormal power down reporting method, a flowchart diagram of which is shown in FIG. 8. The method of the eighth embodiment is for use in a communication system (e.g., the machine-to-machine system 3 of the aforesaid embodiment) as well as a mobile station and a base station (e.g., the mobile station 11 and the base station 13 of the aforesaid embodiment) comprised in the communication system. The mobile station is located within a wireless communication coverage of the base station. Detailed steps of the eighth embodiment are as follows.

Firstly, step 801 is executed to enable the base station to transmit a service flow setting message to the mobile station. The service flow setting message comprises an abnormal power down index which defines an abnormal power down status. Step 802 is executed to enable the mobile station to detect abnormal power down of the mobile station. Then, step 803 is executed to enable the mobile station to transmit a notification message carrying the abnormal power down index to the base station via a contention channel.

Then, step 804 is executed to enable the base station to determine that the abnormal power down index experiences a message collision. Step 1005 is executed to enable the base station to transmit UL bandwidth allocation information to the mobile station. Step 806 is executed to enable the mobile station to transmit a message having an abnormal power down indication to the base station according to the UL bandwidth allocation information. Finally, step 807 is executed to enable the base station to determine that the abnormal power down occurred in the mobile station according to the abnormal power down indication and notify a backhaul network to deregister the mobile station.

Figure 9:
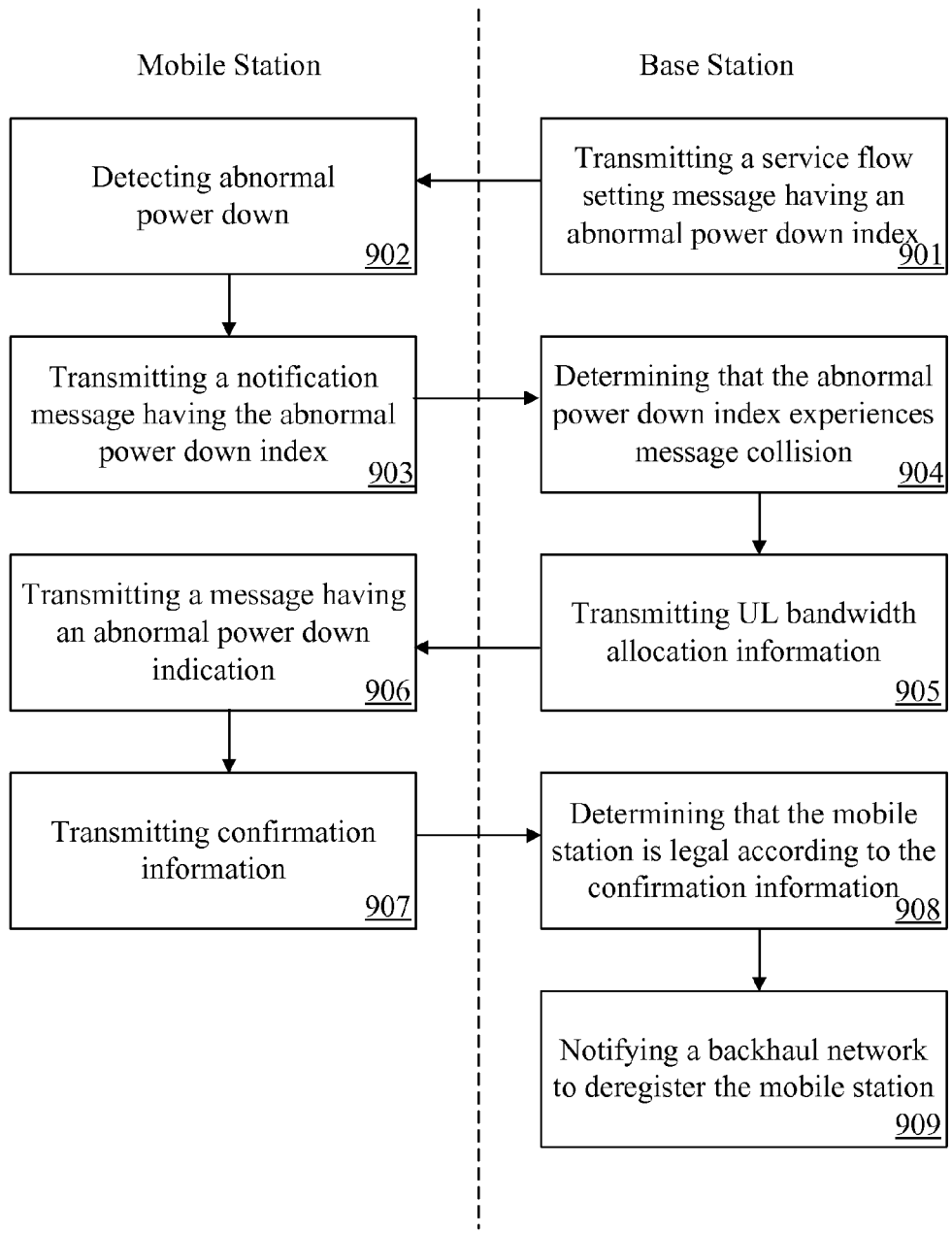
FIG. 9 is a flowchart diagram of an abnormal power down reporting method according to a ninth embodiment of the present invention.

A ninth embodiment of the present invention is an abnormal power down reporting method, a flowchart diagram of which is shown in FIG. 9. The method of the ninth embodiment is for use in a communication system (e.g., the machine-to-machine system 4 of the aforesaid embodiment) as well as a mobile station and a base station (e.g., the mobile station 11 and the base station 13 of the aforesaid embodiment) comprised in the communication system. The mobile station is located within a wireless communication coverage of the base station. Detailed steps of the ninth embodiment are as follows.

Firstly, step 901 is executed to enable the base station to transmit a service flow setting message to the mobile station. The service flow setting message comprises an abnormal power down index which defines an abnormal power down status. Step 902 is executed to enable the mobile station to detect abnormal power down of the mobile station. Then, step 903 is executed to enable the mobile station to transmit a notification message carrying the abnormal power down index to the base station via a contention channel.

Then, step 904 is executed to enable the base station to determine that the bandwidth request index experiences message collision. Step 905 is executed to enable the base station to transmit UL bandwidth allocation information to the mobile station. Step 906 is executed to enable the mobile station to transmit a message having an abnormal power down indication to the base station according to the UL bandwidth allocation information. Step 907 is executed to enable the mobile station to transmit confirmation information to the base station according to the UL bandwidth allocation information. Then, step 908 is executed to enable the base station to determine that the mobile station is legal according to the confirmation information. Finally, step 909 is executed to determine that the abnormal power down occurred in the mobile station according to the abnormal power down indication and notify a backhaul network to deregister the mobile station.

It shall also be appreciated that, if the message used is a header that has already been defined and does not have enough available bits for carrying the confirmation information, then the confirmation information can be independently transmitted to the base station in a way as described in the ninth embodiment. On the other hand, if the message used is a customized header, then appropriate bits can be allocated to carry the confirmation information; and thus, the confirmation information can be transmitted to the base station together with the customized header so as to save the network resource.

Figure 10:
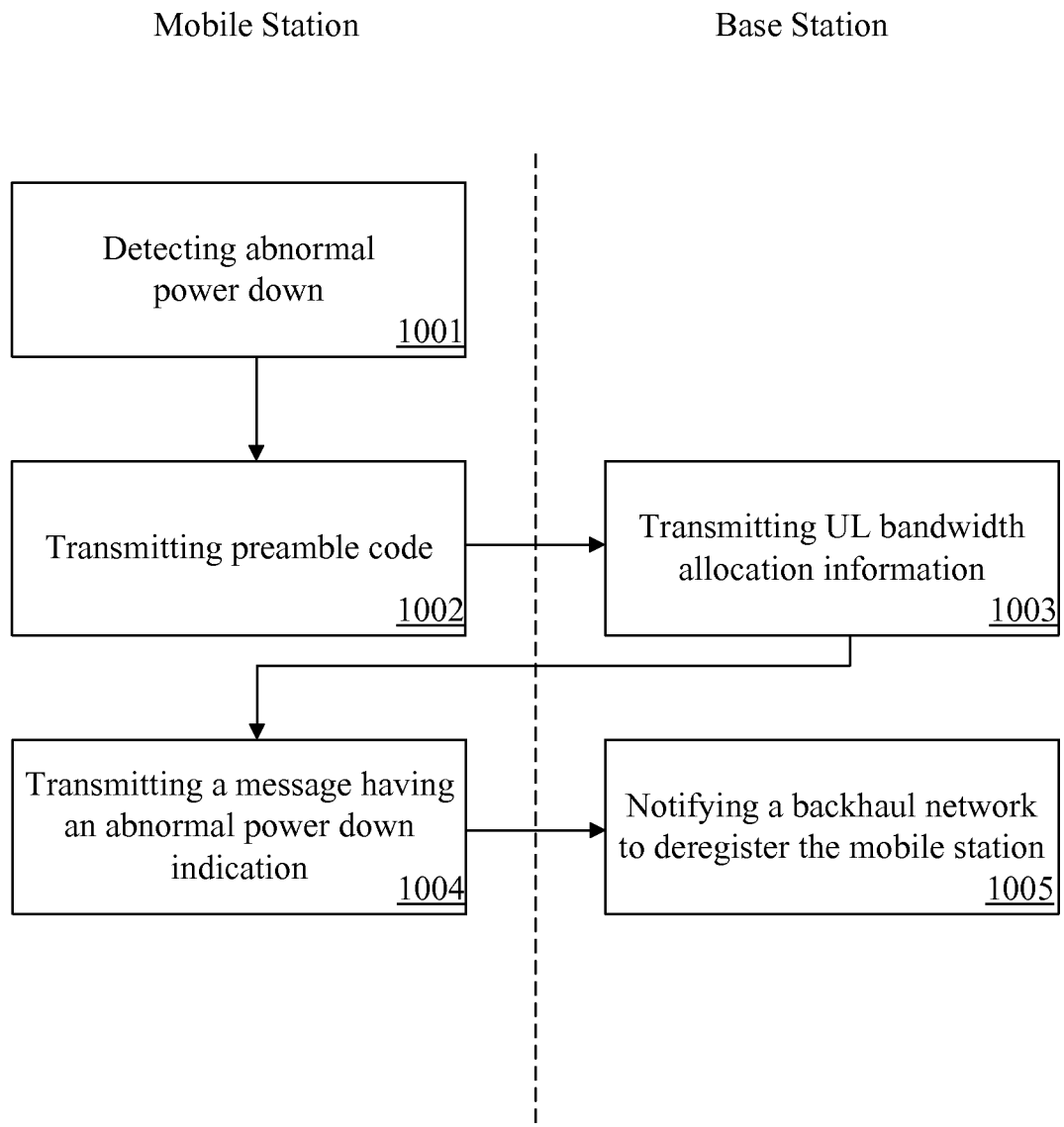
FIG. 10 is a flowchart diagram of an abnormal power down reporting method according to a tenth embodiment of the present invention.

A tenth embodiment of the present invention is an abnormal power down reporting method, a flowchart diagram of which is shown in FIG. 10. The method of the tenth embodiment is for use in a communication system (e.g., the machine-to-machine system 5 of the aforesaid embodiment) as well as a mobile station and a base station (e.g., the mobile station 11 and the base station 13 of the aforesaid embodiment) comprised in the communication system. The mobile station is located within a wireless communication coverage of the base station. Detailed steps of the tenth embodiment are as follows.

Firstly, step 1001 is executed to enable the mobile station to detect abnormal power down of the mobile station. Step 1002 is executed to enable the mobile station to transmit a notification message to the base station. Step 1003 is executed to enable the base station to transmit UL bandwidth allocation information to the mobile station according to the notification message. Step 1004 is executed to enable the mobile station to transmit a message having an abnormal power down indication to the base station according to the UL bandwidth allocation information. Finally, step 1005 is executed to enable the base station to determine that the abnormal power down occurred in the mobile station according to the abnormal power down indication and notify a backhaul network to deregister the mobile station.

Similarly, in the tenth embodiment, the message transmitted from the mobile station to the base station can further have confirmation information. Thus, the base station can firstly decide the legality of the mobile station; and then determine that the abnormal power down occurred in the mobile station according to the abnormal power down indication and notify a backhaul network to deregister the mobile station.

According to the above descriptions, the mobile station, the base station, the communication system and the abnormal power down reporting method thereof of the present invention can accomplish reporting of abnormal power down in the competition procedure. Thereby, the time duration needed for subsequent channel establishment and message transmission can be avoided to significantly increase the efficiency of reporting abnormal power down.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An abnormal power down reporting method for a communication system, the communication system comprising a mobile station and a base station, the mobile station being located within a wireless communication coverage of the base station, the abnormal power down reporting method comprising the steps of:
   (a) transmitting, by the base station, a service flow setting message to the mobile station, wherein the service flow setting message has an abnormal power down index which defines an abnormal power down status;
   (b) detecting, by the mobile station, abnormal power down occurred in the mobile station after step (a);
   (c) transmitting, by the mobile station, a notification message having the abnormal power down index to the base station via a contention channel after step (b);
   (d1) transmitting, by the base station, uplink (UL) bandwidth allocation information to the mobile station according to the abnormal power down index of the notification message;
   (d2) transmitting, by the mobile station, confirmation information to the base station according to the UL bandwidth allocation information;
   (d3) determining, by the base station, that the mobile station is legal according to the confirmation information; and
   (d4) determining, by the base station, that abnormal power down occurred in the mobile station according to the abnormal power down index of the notification message and notify a backhaul network to deregister the mobile station.

2. An abnormal power down reporting method for a communication system, the communication system comprising a mobile station and a base station, the mobile station being located within a wireless communication coverage of the base station, the abnormal power down reporting method comprising the steps of:
   (a) transmitting, by the base station, a service flow setting message to the mobile station, wherein the service flow setting message has an abnormal power down index which defines an abnormal power down status;
   (b) detecting, by the mobile station, abnormal power down occurred in the mobile station after step (a);
   (c) transmitting, by the mobile station, a notification message having the abnormal power down index to the base station via a contention channel after step (b);
   (d1) determining, by the base station, that the abnormal power down index of the notification message experiences message collision;
   (d2) transmitting, by the base station, UL bandwidth allocation information to the mobile station after step (d1);
   (d3) transmitting, by the mobile station, a message having an abnormal power down indication to the base station according to the UL bandwidth allocation information; and
   (d4) determining, by the base station, that abnormal power down occurred in the mobile station according to the abnormal power down indication and notify the backhaul network to deregister the mobile station.

3. The abnormal power down reporting method as claimed in claim 2, comprising the following steps after step (d3):
   (d31) transmitting, by the mobile station, confirmation information to the base station according to the UL bandwidth allocation information;
   (d32) determining, by the base station, that the mobile station is legal according to the confirmation information.

4. The abnormal power down reporting method as claimed in claim 2, wherein the message further has confirmation information, and the abnormal power down reporting method further comprises the following steps after step (d3):
   (d31) determining, by the base station, that the mobile station is legal according to the confirmation information.

5. An abnormal power down reporting method for a communication system, the communication system comprising a mobile station and a base station, the mobile station being located within a wireless communication coverage of the base station, the abnormal power down reporting method comprising the steps of:
   (a) detecting, by the mobile station, abnormal power down occurred in the mobile station;
   (b) transmitting, by the mobile station, a preamble code to the base station after step (a);
   (c) transmitting, by the base station, UL bandwidth allocation information to the mobile station according to the preamble code;
   (d) transmitting, by the mobile station, a message, having an abnormal power down indication and confirmation information, to the base station according to the UL bandwidth allocation information;
   (e1) determining, by the base station, that the mobile station is legal according to the confirmation information; and
   (e2) determining after step (e1), by the base station, that abnormal power down occurred in the mobile station according to the abnormal power down indication and notify the backhaul network to deregister the mobile station.

6. A communication system, comprising:
a base station; and
a mobile station, being located within a wireless communication coverage of the base station;
wherein the base station transmits a service flow setting message to the mobile station, the service flow setting message has an abnormal power down index which defines an abnormal power down status, the mobile station detects abnormal power down occurred in the mobile station and transmits a notification message having the abnormal power down index to the base station via a contention channel, the base station transmits uplink (UL) bandwidth allocation information to the mobile station according to the abnormal power down index of the notification message, the mobile station transmits confirmation information to the base station according to the UL bandwidth allocation information, the base station determines that the mobile station is legal according to the confirmation information, and the base station determines that abnormal power down occurred in the mobile station according to the abnormal power down index of the notification message and notifies a backhaul network to deregister the mobile station.

7. A communication system, comprising:
a base station; and
a mobile station, being located within a wireless communication coverage of the base station;
wherein the base station transmits a service flow setting message to the mobile station, the service flow setting message has an abnormal power down index which defines an abnormal power down status, the mobile station detects abnormal power down occurred in the mobile station and transmits a notification message having the abnormal power down index to the base station via a contention channel, the base station determines that the abnormal power down index of the notification message experiences message collision and transmits UL bandwidth allocation information to the mobile station, the mobile station transmits a message having an abnormal power down indication to the base station according to the UL bandwidth allocation information, and the base station determines that abnormal power down occurred in the mobile station according to the abnormal power down indication and notify the backhaul network to deregister the mobile station.

8. The communication system as claimed in claim 7, wherein the mobile station further transmits confirmation information to the base station according to the UL bandwidth allocation information, and the base station further determines that the mobile station is legal according to the confirmation information.

9. The communication system as claimed in claim 7, wherein the message further has confirmation information, and the base station further determines that the mobile station is legal according to the confirmation information.

10. A communication system, comprising:
a base station; and
a mobile station, being located within a wireless communication coverage of the base station;
wherein the mobile station detects abnormal power down occurred in the mobile station and transmits a preamble code to the base station, the base station further transmits UL bandwidth allocation information to the mobile station according to the UL bandwidth allocation information, the mobile station transmits a message, having an abnormal power down indication and confirmation information, to the base station according to the UL bandwidth allocation information, and the base station determines that the mobile station is legal according to the confirmation information, and notifies the backhaul network to deregister the mobile station after determining that abnormal power down occurred in the mobile station according to the abnormal power down indication.

11. An abnormal power down reporting method for a mobile station, the mobile station being used in a communication system, the communication system further comprising a base station, the mobile station being located within a wireless communication coverage of the base station, the abnormal power down reporting method comprising the steps of:
(a) receiving, by the mobile station, a service flow setting message from the base station, wherein the service flow setting message has an abnormal power down index which defines an abnormal power down status;
(b) detecting, by the mobile station, abnormal power down occurred in the mobile station after step (a);
(c1) transmitting after step (b), by the mobile station, a notification message having the abnormal power down index to the base station via the a contention channel;
(c2) receiving, by the mobile station, UL bandwidth allocation information from the base station after step (c1); and
(c3) transmitting, by the mobile station, confirmation information to the base station according to the UL bandwidth allocation information so that the base station determines that the mobile station is legal according to the confirmation information, and deregisters the mobile station after determining that abnormal power down occurred in the mobile station according to the abnormal power down index.

12. An abnormal power down reporting method for a mobile station, the mobile station being used in a communication system, the communication system further comprising a base station, the mobile station being located within a wireless communication coverage of the base station, the abnormal power down reporting method comprising the steps of:
(a) receiving, by the mobile station, a service flow setting message from the base station, wherein the service flow setting message has an abnormal power down index which defines an abnormal power down status;
(b) detecting, by the mobile station, abnormal power down occurred in the mobile station after step (a);
(c1) transmitting after step (b), by the mobile station to, a notification message having the abnormal power down index to the base station via a contention channel so that the base station determines that the abnormal power down index experiences message collision;
(c2) receiving, by the mobile station, UL bandwidth allocation information from the base station after step (c1); and
(c3) transmitting, by the mobile station, a message having an abnormal power down indication to the base station according to the UL bandwidth allocation information so that the base station determines that abnormal power down occurred in the mobile station according to the abnormal power down indication and notifies the backhaul network to deregister the mobile station.

13. The abnormal power down reporting method as claimed in claim 12, wherein the step (c3) further comprises the following steps:
(c31) transmitting, by the mobile station, the message having the abnormal power down indication to the base station according to the UL bandwidth allocation information; and (c32) transmitting, by the mobile station, confirmation information to the base station according to the UL bandwidth allocation information so that the base station determines that the mobile station is legal according to the confirmation information, and notifies the backhaul network to deregister the mobile station after determining that abnormal power down occurred in the mobile station according to the abnormal power down indication.

14. The abnormal power down reporting method as claimed in claim 12, wherein the message further has confirmation information, and the step (c3) further comprises the following steps:
(c31) transmitting, by the mobile station, the message having the abnormal power down indication and the confirmation information to the base station according to the UL bandwidth allocation information so that the base station determines that the mobile station is legal according to the confirmation information, and notifies the backhaul network to deregister the mobile station after determining that abnormal power down occurred in the mobile station according to the abnormal power down indication.

15. An abnormal power down reporting method for a mobile station, the mobile station being used in a communication system, the communication system further comprising a base station, the mobile station being located within a wireless communication coverage of the base station, the abnormal power down reporting method comprising the steps of:
(a) detecting, by the mobile station, abnormal power down occurred in the mobile station;
(b) transmitting, by the mobile station, a preamble code to the base station after step (a);
(c) receiving, by the mobile station, UL bandwidth allocation information from the base station after step (b); and
(d) transmitting, by the mobile station, a message, having an abnormal power down indication and confirmation information, to the base station according to the UL bandwidth allocation information so that the base station determines that the mobile station is legal according to the confirmation information, and notifies the backhaul network to deregister the mobile station after determining that abnormal power down occurred in the mobile station according to the abnormal power down indication.

16. A mobile station for use in a communication system, the communication system further comprising a base station, the mobile station being located within a wireless communication coverage of the base station, the mobile station comprising:
a processing unit, being configured to detect abnormal power down occurred in the mobile station; and
a transceiver, being configured to receive a service flow setting message from the base station, wherein the service flow setting message has an abnormal power down index which defines an abnormal power down status;
wherein the transceiver is further configured to, after abnormal power down of the mobile station is detected by the processing unit, transmit a notification message having the abnormal power down index to the base station via a contention channel, to receive UL bandwidth allocation information from the base station, and to transmit confirmation information to the base station according to the UL bandwidth allocation information so that the base station determines that the mobile station is legal according to the confirmation information, and notifies a backhaul network to deregister the mobile station after determining that abnormal power down occurred in the mobile station according to the abnormal power down index.

17. A mobile station for use in a communication system, the communication system further comprising a base station, the mobile station being located within a wireless communication coverage of the base station, the mobile station comprising:
a processing unit, being configured to detect abnormal power down occurred in the mobile station; and
a transceiver, being configured to receive a service flow setting message from the base station, wherein the service flow setting message has an abnormal power down index which defines an abnormal power down status;
wherein the transceiver is further configured to, after abnormal power down of the mobile station is detected by the processing unit, transmit a notification message having the abnormal power down index to the base station via a contention channel so that the base station determines that the abnormal power down index experiences message collision, and the transceiver is further configured to receive UL bandwidth allocation information from the base station and transmit a message having an abnormal power down indication to the base station according to the UL bandwidth allocation information so that the base station determines that abnormal power down occurred in the mobile station according to the abnormal power down indication and notifies the backhaul network to deregister the mobile station.

18. The mobile station as claimed in claim 17, wherein the transceiver is further configured to transmit confirmation information to the base station according to the UL bandwidth allocation information so that the base station determines that the mobile station is legal according to the confirmation information, and notifies the backhaul network to deregister the mobile station after determining that abnormal power down occurred in the mobile station according to the abnormal power down indication.

19. The mobile station as claimed in claim 17, wherein the message further has confirmation information, the transceiver is further configured to transmit the message to the base station according to the UL bandwidth allocation information so that the base station determines that the mobile station is legal according to the confirmation information, and notifies the backhaul network to deregister the mobile station after determining that abnormal power down occurred in the mobile station according to the abnormal power down indication.

20. A mobile station for use in a communication system, the communication system further comprising a base station, the mobile station being located within a wireless communication coverage of the base station, the mobile station comprising:
a processing unit, being configured to detect abnormal power down occurred in the mobile station; and
a transceiver, being configured to, after the processing unit detects abnormal power down occurred in the mobile station, transmit a preamble code to the base station, and receive UL bandwidth allocation information from the base station;
wherein the transceiver is further configured to transmit a message, having an abnormal power down indication and confirmation information, to the base station according to the UL bandwidth allocation information so that the base station determines that the mobile station is legal according to the confirmation information, and notifies the backhaul network to deregister the mobile station after determining that abnormal power down occurred in the mobile station according to the abnormal power down indication.

21. An abnormal power down reporting method for a base station, the base station being used in a communication system, the communication system further comprising a mobile station, the mobile station being located within a wireless communication coverage of the base station, the abnormal power down reporting method comprising the steps of:
(a) transmitting, by the base station, a service flow setting message to the mobile station, wherein the service flow setting message has an abnormal power down index which defines an abnormal power down status;
(b) receiving, by the base station, a notification message having the abnormal power down index from the mobile station via a contention channel after abnormal power down occurred in the mobile station is detected by the mobile station;
(c1) transmitting, by the base station, UL bandwidth allocation information to the mobile station according to the abnormal power down index of the notification message;
(c2) receiving, by the base station, confirmation information from the mobile station after step (c1);
(c3) determining, by the base station, that the mobile station is legal according to the confirmation information; and
(c4) determining after step (c3), by the base station, that abnormal power down occurred in the mobile station according to the abnormal power down index of the notification message and notify a backhaul network to deregister the mobile station.

22. An abnormal power down reporting method for a base station, the base station being used in a communication system, the communication system further comprising a mobile station, the mobile station being located within a wireless communication coverage of the base station, the abnormal power down reporting method comprising the steps of:
(a) transmitting, by the base station, a service flow setting message to the mobile station, wherein the service flow setting message has an abnormal power down index which defines an abnormal power down status;
(b) receiving, by the base station, a notification message having the abnormal power down index from the mobile station via a contention channel after abnormal power down occurred in the mobile station is detected by the mobile station;
(c1) determining, by the base station, that the abnormal power down index of the notification message experiences message collision;
(c2) transmitting, by the base station, UL bandwidth allocation information to the mobile station after step (c1);
(c3) receiving, by the base station, a message having an abnormal power down indication from the mobile station after step (c2); and
(c4) determining, by the base station, that abnormal power down occurred in the mobile station according to the abnormal power down indication and notify the backhaul network to deregister the mobile station.

23. The abnormal power down reporting method as claimed in claim 22, further comprising the following steps after step (c3):
(c31) receiving, by the base station, confirmation information from the mobile station after step (c3); and
(c32) determining, by the base station, that the mobile station is legal according to the confirmation information.

24. The abnormal power down reporting method as claimed in claim 22, wherein the message further has confirmation information, and the abnormal power down reporting method further comprises the following step after step (c3):
(c31) determining, by the base station, that the mobile station is legal according to the confirmation information.

25. An abnormal power down reporting method for a base station, the base station being used in a communication system, the communication system further comprising a mobile station, the mobile station being located within a wireless communication coverage of the base station, the abnormal power down reporting method comprising the steps of:
(a) receiving, by the base station, a preamble code from the mobile station after abnormal power down occurred in the mobile station is detected by the mobile station;
(b) transmitting, by the base station, UL bandwidth allocation information to the mobile station so that the mobile station transmits a message, having an abnormal power down indication and confirmation information, to the base station according to the UL bandwidth allocation information;
(c1) determining, by the base station, that the mobile station is legal according to the confirmation information;
(c2) determining after step (c2), by the base station, that abnormal power down occurred in the mobile station according to the abnormal power down indication of the message and notify a backhaul network to deregister the mobile station.

26. A base station for use in a communication system, the communication system further comprising a mobile station, and the mobile station being located within a wireless communication coverage of the base station, the base station comprising:
a transceiver, being configured to transmit a service flow setting message to the mobile station, wherein the service flow setting message has an abnormal power down index which defines an abnormal power down status; and
a processing unit;
wherein the transceiver is further configured to receive a notification message having the abnormal power down index from the mobile station via a contention channel after abnormal power down occurred in the mobile station is detected by the mobile station, the transceiver is further configured to transmit UL bandwidth allocation information to the mobile station according to the abnormal power down index of the notification message and to receive confirmation information from the mobile station, and the processing is further configured to determine that the mobile station is legal according to the confirmation information, and to determine that abnormal power down occurred in the mobile station according to the abnormal power down index of the notification message and notify a backhaul network to deregister the mobile station.

27. A base station for use in a communication system, the communication system further comprising a mobile station, and the mobile station being located within a wireless communication coverage of the base station, the base station comprising:
a transceiver, being configured to transmit a service flow setting message to the mobile station, wherein the service flow setting message has an abnormal power down index which defines an abnormal power down status; and
a processing unit;

wherein the transceiver is further configured to receive a notification message having the abnormal power down index from the mobile station via a contention channel after abnormal power down occurred in the mobile station is detected by the mobile station, the processing unit is further configured to determine that the abnormal power down index of the notification message experiences message collision, the transceiver is further configured to transmit UL bandwidth allocation information to the mobile station and receive a message having an abnormal power down indication from the mobile station, and the processing unit is further configured to determine that abnormal power down occurred in the mobile station according to the abnormal power down indication and notify the backhaul network to deregister the mobile station.

28. The base station as claimed in claim 27, wherein the transceiver is further configured to receive confirmation information from the mobile station, and the processing unit is further configured to determine that the mobile station is legal according to the confirmation information.

29. The base station as claimed in claim 27, wherein the message further has confirmation information and the processing unit is further configured to determine that the mobile station is legal according to the confirmation information.

30. A base station for use in a communication system, the communication system further comprising a mobile station, and the mobile station being located within a wireless communication coverage of the base station, the base station comprising:
  a transceiver, being configured to receive a preamble code from the mobile station after abnormal power down occurred in the mobile station is detected by the mobile station, and to transmit UL bandwidth allocation information to the mobile station so that the mobile station transmits a message, having an abnormal power down indication and confirmation information, to the base station according to the UL bandwidth allocation information;
  a processing unit, being configured to determine that the mobile station is legal according to the confirmation information, and to notify the backhaul network to deregister the mobile station by the transceiver after determining abnormal power down occurred in the mobile station.

* * * * *